United States Patent
Turley et al.

(10) Patent No.: US 11,202,127 B2
(45) Date of Patent: Dec. 14, 2021

(54) USER UPLOADED VIDEOSTREAMING SYSTEM WITH SOCIAL MEDIA NOTIFICATION FEATURES AND RELATED METHODS

(71) Applicants: Jason Turley, Midway, UT (US); Trevyn Andrew Meyer, Midway, UT (US)

(72) Inventors: Jason Turley, Midway, UT (US); Trevyn Andrew Meyer, Midway, UT (US)

(73) Assignee: Jason Turley, Midway, UT (US)

( * ) Notice: Subject to any disclaimer, the term of this patent is extended or adjusted under 35 U.S.C. 154(b) by 0 days.

(21) Appl. No.: 16/280,965

(22) Filed: Feb. 20, 2019

(65) Prior Publication Data
US 2019/0387281 A1    Dec. 19, 2019

Related U.S. Application Data

(60) Provisional application No. 62/632,897, filed on Feb. 20, 2018.

(51) Int. Cl.
| | |
|---|---|
| *H04N 21/4788* | (2011.01) |
| *H04L 12/58* | (2006.01) |
| *H04N 21/4786* | (2011.01) |
| *H04N 21/2187* | (2011.01) |
| *H04N 21/218* | (2011.01) |
| *H04L 29/08* | (2006.01) |
| *H04L 29/06* | (2006.01) |

(52) U.S. Cl.
CPC ......... *H04N 21/4788* (2013.01); *H04L 51/32* (2013.01); *H04L 65/60* (2013.01); *H04L 67/10* (2013.01); *H04N 21/218* (2013.01); *H04N 21/2187* (2013.01); *H04N 21/4786* (2013.01)

(58) Field of Classification Search
CPC ...... H04N 21/2187; H04L 65/60; H04L 67/10
See application file for complete search history.

(56) References Cited

U.S. PATENT DOCUMENTS 7,218,921 B2 * 5/2007 Mendiola .......... H04L 29/12009
                                                        455/414.1
7,457,582 B2    11/2008 Kamada et al.
(Continued)

FOREIGN PATENT DOCUMENTS

WO    2016160096 A1    10/2016
WO    2017132197 A1    8/2017

*Primary Examiner* — Lashonda T Jacobs
(74) *Attorney, Agent, or Firm* — Bretton L. Crockett; TechLaw Ventures, PLLC

(57) ABSTRACT

The present disclosure includes methods, processes and systems for notification of the availability of real-time streaming video of an event of interest to a first user, where the video may be streamed to the system by a user. In one illustrative embodiment, a multiple layer social media aspect may be used for organizing users to receive notifications and receiving videos. The system may aggregate video streams from multiple users to allow display through the system accessible to any subscribing user. The system may further allow for real-time commenting and feedback to be provided by users to the uploading user or to a subject of the video. User data may be sorted by followings, teams and other information in databases for management and access.

20 Claims, 2 Drawing Sheets

(56) References Cited

U.S. PATENT DOCUMENTS

| | | | | |
|---|---|---|---|---|
| 8,555,177 B1* | 10/2013 | Junee | | H04L 12/1822 715/751 |
| 8,568,236 B2* | 10/2013 | Baray | | A63F 13/12 463/42 |
| 8,949,948 B2* | 2/2015 | Callahan | | H04L 63/104 726/4 |
| 9,454,993 B1* | 9/2016 | Lawson | | H04N 21/47205 |
| 9,583,144 B2 | 2/2017 | Ricciardi | | |
| 9,736,502 B2 | 8/2017 | Barber | | |
| 9,872,076 B1* | 1/2018 | Lewis | | G06F 16/78 |
| 9,985,998 B1* | 5/2018 | Lewis | | H04L 65/403 |
| 10,078,909 B1* | 9/2018 | Chen | | G06N 20/00 |
| 10,118,081 B2* | 11/2018 | Huebsch | | A63B 71/06 |
| 10,219,009 B2* | 2/2019 | Chang | | H04L 65/4076 |
| 10,334,282 B2* | 6/2019 | Li | | H04N 21/2187 |
| 10,353,972 B2* | 7/2019 | Twyman | | G06F 16/7867 |
| 10,375,188 B2* | 8/2019 | Gutman | | H04L 67/26 |
| 10,489,016 B1* | 11/2019 | Yue | | H04N 21/2387 |
| D868,818 S* | 12/2019 | Hansen | | D14/486 |
| D879,826 S* | 3/2020 | Hansen | | D14/486 |
| D880,515 S* | 4/2020 | Hansen | | D14/486 |
| D881,231 S* | 4/2020 | Hansen | | D14/486 |
| 2008/311996 A1* | 12/2008 | Belton | | H04N 21/4758 463/42 |
| 2008/0320159 A1* | 12/2008 | Naimark | | H04N 21/8133 709/231 |
| 2010/0048187 A1* | 2/2010 | Sullivan | | H04N 21/2187 455/414.3 |
| 2010/0188485 A1* | 7/2010 | Abrams | | H04N 21/8153 348/46 |
| 2012/0224021 A1* | 9/2012 | Begeja | | H04N 7/155 348/14.08 |
| 2013/0247120 A1* | 9/2013 | Milgramm | | H04N 21/4826 725/110 |
| 2014/0157307 A1* | 6/2014 | Cox | | H04N 21/4331 725/34 |
| 2014/0379819 A1* | 12/2014 | Chestnut | | H04W 12/02 709/206 |
| 2015/0058345 A1* | 2/2015 | Mishra | | G06Q 30/0261 707/737 |
| 2015/0081786 A1 | 3/2015 | Taylor et al. | | |
| 2015/0172897 A1* | 6/2015 | Mariathasan | | H04M 1/72409 455/404.1 |
| 2015/0188757 A1* | 7/2015 | Amidei | | H04W 4/21 709/217 |
| 2015/0264001 A1* | 9/2015 | Garg | | H04M 1/27457 709/206 |
| 2015/0280930 A1 | 10/2015 | Zamer et al. | | |
| 2016/0042611 A1* | 2/2016 | Abrahams | | G06Q 50/00 463/9 |
| 2016/0082341 A1* | 3/2016 | Phillip | | A63B 24/00 700/92 |
| 2016/0255082 A1* | 9/2016 | Rathod | | H04L 51/32 726/1 |
| 2016/0274744 A1* | 9/2016 | Neumann | | H04N 21/47202 |
| 2016/0277802 A1* | 9/2016 | Bernstein | | H04N 21/431 |
| 2016/0286244 A1* | 9/2016 | Chang | | H04N 21/4788 |
| 2016/0379441 A1* | 12/2016 | Oley | | G07F 17/3241 463/29 |
| 2017/0214945 A1* | 7/2017 | Chang | | H04N 21/6125 |
| 2017/0289589 A1* | 10/2017 | Koumchatzky | | H04N 21/4788 |
| 2018/0255360 A1* | 9/2018 | Li | | H04N 21/2187 |
| 2019/0110112 A1* | 4/2019 | Maloney | | H04N 21/854 |
| 2019/0132613 A1* | 5/2019 | Jiao | | H04L 65/4076 |
| 2019/0208264 A1* | 7/2019 | Delaney | | G06F 16/48 |
| 2019/0333023 A1* | 10/2019 | Foran | | G06Q 10/107 |
| 2020/0154166 A1* | 5/2020 | Rakshit | | H04N 21/2187 |

* cited by examiner

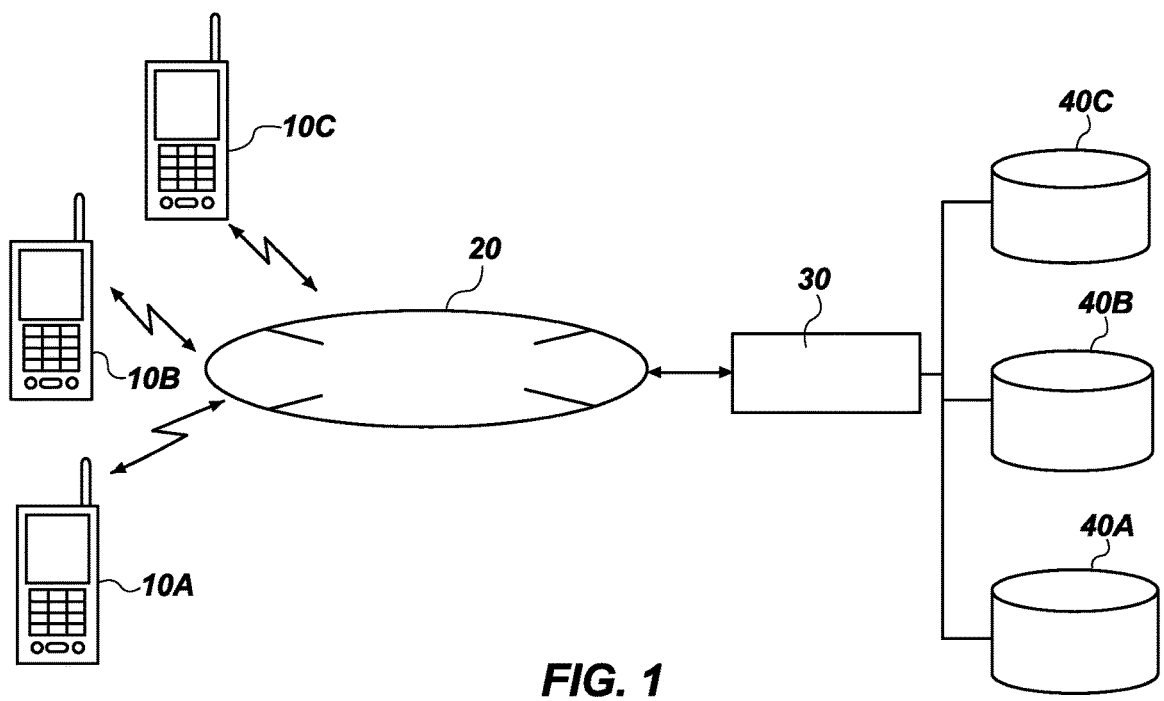
FIG. 1
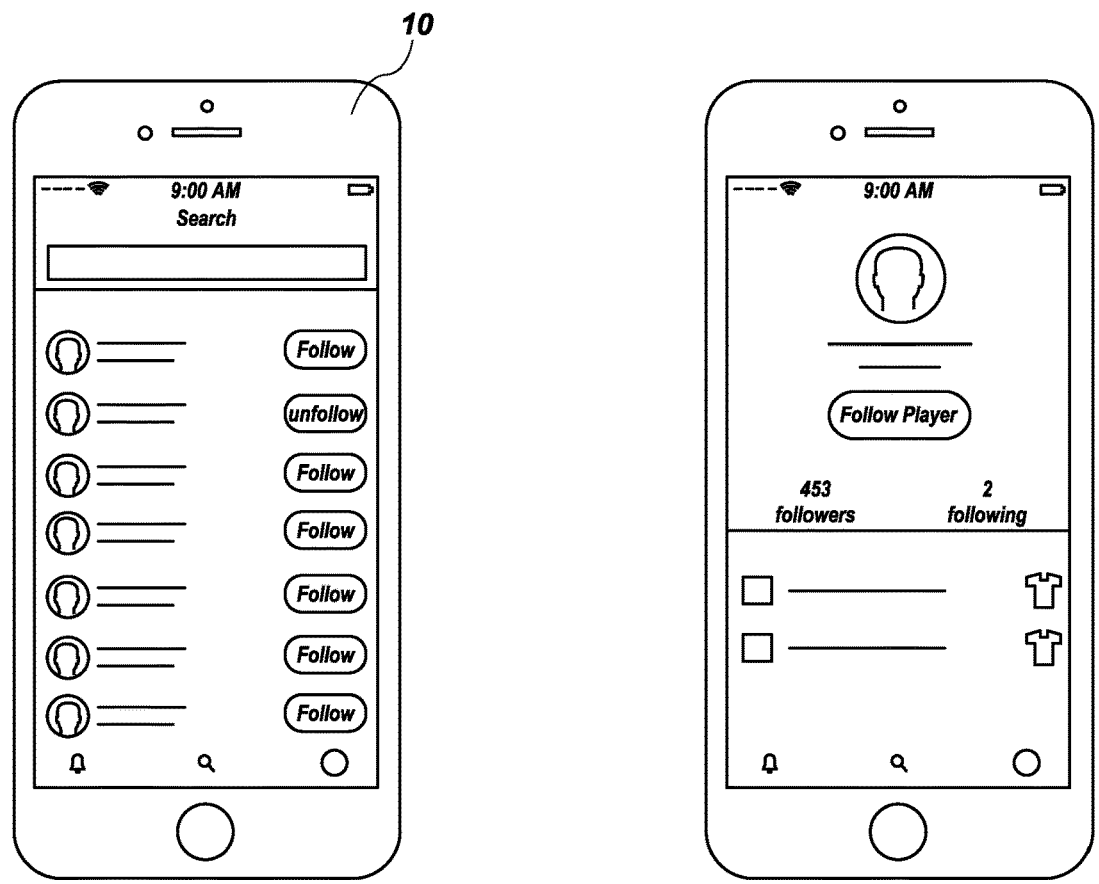
FIG. 2
FIG. 3

USER UPLOADED VIDEOSTREAMING SYSTEM WITH SOCIAL MEDIA NOTIFICATION FEATURES AND RELATED METHODS

CROSS-REFERENCE TO RELATED APPLICATION

This application claims the benefit of U.S. Provisional Application No. 62/632,897, filed Feb. 20, 2018, which is hereby incorporated by reference herein in its entirety, including but not limited to those portions that specifically appear hereinafter.

TECHNICAL FIELD

The present disclosure relates to social media systems and video streaming over computer networks.

BACKGROUND

People have limited time and must select what videos they watch from numerous options. Notifying potential viewers of the availability of entertainment has long been done by advertising. As viewing has shifted online and onto portable devices, this type of advertising has followed suit. For example, U.S. Pat. No. 7,457,582 to Kamada et al, entitled Broadcast Program Scene Notification System, the contents of which are incorporated herein in its entirety, will transmit a message to registered users that a scene appearing in a broadcast program that they have expressed interest is about to be broadcast. However, such systems are of limited applicability.

It is fairly common for a family to have multiple members involved in sports, such as multiple children or grandchildren playing in sports in different leagues or at separate locations. In this situation, it is simply impossible for every family member or other interested party to attend all the games for each player and to watch every player of interest. A system or methods that allowed for viewing by those interested in real time, and that provided notifications of when to watch would be an improvement in the art. Such a system that allowed for real-time feedback would be a further improvement in the art.

SUMMARY

The present disclosure includes methods, processes and systems for notification of the availability of real-time streaming video of an event of interest to a first user, where the video may be streamed to the system by a user. In one illustrative embodiment, a multiple layer social media aspect may be used for organizing users to receive notifications and receiving videos. The system may aggregate video streams from multiple users to allow display through the system accessible to any subscribing user. The system may further allow for real-time commenting and feedback to be provided by users to the uploading user or to a subject of the video. User data may be sorted by followings, teams and other information in databases for management and access.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. It will be appreciated by those of ordinary skill in the art that the various drawings are for illustrative purposes only. The nature of the present disclosure, as well as other embodiments in accordance with this disclosure, may be more clearly understood by reference to the following detailed description, to the appended claims, and to the several drawings.

FIG. 1 is a block diagram representing an example non-limiting networked environment in which various embodiments described herein can be implemented.

FIGS. 2, 3, 4, 5 and 6 are images of one potential mobile device displaying screens for user interaction that may be useful in one illustrative embodiment in accordance with the present disclosure.

DETAILED DESCRIPTION

Figure 4:
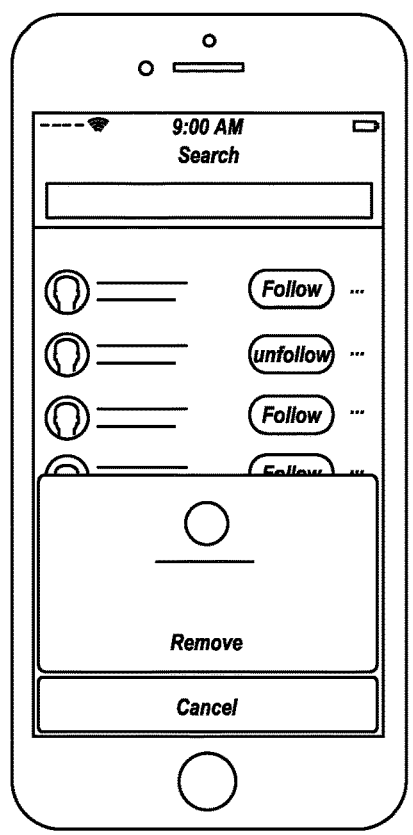

The present disclosure relates to apparatus, systems and methods for video streaming with notifications and social medial features. It will be appreciated by those skilled in the art that the embodiments herein described, while illustrative, are not intended to so limit this disclosure or the scope of the appended claims. Those skilled in the art will also understand that various combinations or modifications of the embodiments presented herein can be made without departing from the scope of this disclosure. All such alternate embodiments are within the scope of the present disclosure.

In general, any of the disclosed methods and processes can take the form of instructions carried on a non-transitory storage medium and executable by, and/or at the direction of, one or more hardware processors and/or other computer hardware. Such non-transitory storage media and the processors or other hardware that execute the carried instructions are considered to be within the scope of this invention. As well, the disclosed processes may ascribe various functionalities to elements disclosed herein. However, such allocations of functionalities are presented only by way of example and, in other embodiments, those functionalities can be allocated differently. Thus, it should be understood that the scope of the invention is not limited to any particular allocation or performance of functions.

In one illustrative embodiment, systems and methods in accordance with the present disclosure may be conducted and provided using computer processors and memory systems connected to a computer network. FIG. 1 is a block diagram of a nonlimiting example of a network environment wherein various method and process embodiments discussed herein can operate. User operated computing devices 10A, 10B may comprise different devices, such as personal digital assistants (PDAs), audio/video devices, mobile phones, MP3 players, personal computers, laptops, etc. Each of these computing objects or devices may serve as an endpoint that is utilized by an end user for the use methods disclosed herein. In some embodiments, it will be appreciated that the user operated computing devices may be mobile computing devices, such as tablet computers and smartphones.

The mobile computing devices 10A, et seq., each connect to a computing object 30 that may function as a server for controlling aspects of the methods and systems discussed herein, via a communications network 20, which may include the internet. It will be appreciated that server 30 will include processors, memory and software instructions that may be followed to perform the processes discussed herein. It will be further appreciated that server 30 is only representative and that in different embodiments, aspects and processing for the various methods may be distributed among multiple computing objects.

A number of databases 40A, 40B are accessible by the server 30 to perform the methods discussed herein. For example, a user database 40A contains information regarding the users of the system and a team/player database 40B may contain player and team roster and scheduling information for use in information. Other databases may include social media information and stored video data. It will be appreciated that the particular number of databases may vary based on the system design and specific system application as will be discussed further herein. It will be further appreciated that some databases may be commercially available from third party sources and accessed by the systems and methods discussed herein.

In one illustrative embodiment in which users associated with a little league baseball organization will be used as one example, a system in accordance with the present disclosure may include software stored on a mobile computing device 10 such as a smartphone or a tablet computer running an "app" and databases 40 for storing information that are remotely hosted on and/or accessed by servers 30 connected to a network 20, such as the internet. In a typical embodiment, a user may contact a system in accordance with the present disclosure using a mobile computing device, such as a smartphone 10 (as graphically illustrated in FIGS. 2-6) that is connected to a network, as by using a wireless data protocol over a wireless telephone data network or via WIFI.

In this illustrative embodiment, an organization, such as a little league baseball organization, may opt to use the system to offer users associated with the league access to notifications of events of interest occurring, live stream viewing access to those events of interest, and access to social media aspects of the system based around those events.

In the illustrative embodiment, the league organization subscribes to a system similar to that depicted in FIG. 1. Team rosters, including player lists, and a schedule of event, such as games are provided and information regarding these is stored in a database, 40. For example, the order of batters for each game in a baseball or softball league may be provided. It will be appreciated that this information may be continually updated, as by informing the system of the start of a game or the changes occurring as they happen in real-time. Contact information for each player on a team, such as a mobile telephone number or an email address that is provided by, and associated, with that player, is also stored. For example, a league could provide a parent's mobile telephone number for each player on a team that is retained in a database.

The system may then be actuated for each team may to send a notification to the contact information for each player, which contains an invitation to subscribe and join the system as a member of that team. Where access to the system is offered via an "app" on a mobile device, this may be done using a push notification over ANDROID or APPLE protocols, as an SMTP message, as an email, or as is otherwise known in the art. Each individual player is then able to subscribe to the system by responding to the invitation on a receiving device. It will be appreciated that for a little league situation, this may be performed by a parent. Each player can then provide contact information for additional users to subscribe to the system as "fans" by providing suitable contact information for potential users. The system may aggregate this information in a database as associated with that player and then send notifications to those potential users identifying the providing player and inviting those potential users to subscribe to the system as a "fan" of that player.

Once a "fan" user has subscribed to the system, they are then able to "follow" that player in the system. In some embodiments, once a user has subscribed to the system as a player or as a fan, the user may be able to search the system for players and then "follow" those players. This may be done using a graphical interface on a suitable device, as shown in FIGS. 2-3.

It will be appreciated that teams and players may be able to rescind an invitation to a user, providing control over followers. Additionally, a player may be able to remove followers, which is depicted being done via a graphical interface on a suitable device, as shown in FIG. 4. This can provide a level of privacy or protection for players.

One aspect of the system is the access to a second level of social media by communicating only with a first level. For example, the system accesses individuals on a first level of a social media platform, such as the players in the illustrative embodiment, who in turn grant access to a second level, social media friends and contacts. This allows the players and other subscribers to limit and expand access as desired. Further, it may allow the system to use preexisting social media networks to send notifications to the second level.

It will be appreciated that the system may be monetized by charging a subscription fee either to the organization, the teams, and/or to individual users. In one unique form of monetization, a notification regarding the availability of a streaming video fearing a particular player may include a link allowing onetime access to video through the system by payment made in response to the notification. For example, the notification may include a link, allowing authorization to a prestored payment method (or access to input information for a payment method) that then allows access to the video associated with that notification. This would allow occasional users to access only videos of immediate interest and to only pay for access to such videos. For example, in a child's baseball league usage, a user following on one child of interest (such as child or grandchild) may be able to pay for access to a single video of just that child. This could be desirable where the user typically attends games in person, but occasionally is unable to, and wants to limit their subscription to just portion of a game that is of interest.

Another potential monetization of the methods and systems of the present disclosure is the inclusion of gaming features that can be accessed by users through the system in certain embodiments. For example, a user could place a wager on an event for which they receive a notification through the system. This may be an event specific wager, for example in a baseball game they could place a wager on whether a "hit" will take place when a particular player is up to bat for which they were notified. Such a wager could be based on the result obtained (strike out, walk, single, double, triple, etc.). It could also be an overall outcome of the game in which the event takes place, such as a winner or a final score, or another wager related to the game or the specific event. Such wagering features may utilize appropriate financial information in the system that are associated with a user's account, such as banking or credit card information that is protected by appropriate security measures. In certain embodiments, features may be present to allow the use of cryptocurrency, such as BITCOIN for wagering.

In some embodiments, any user may be able to create a team by searching players and adding them to a user created team list in the system. For example, where the user is a member of a family, the user could create a family team comprising related players in a league and then issue invitations to subscribe to family members that want to follow those players. Alternatively, a user could create a fantasy team, which may be useful where the organization is not a little league but is a professional sports league. In either case, during use the system will allow a user to organize or access the "team" as a team or in a lineup, such that any streaming video featuring or associated with members of the team are accessed in order in a single session. For example, the system could load a list of players designated by the user as a team and advance to each player for viewing and thus avoid the user's need to use commands or log in multiple times to receive notifications regarding each player followed by that user.

When the organization begins to hold games, the system is used provide streaming video of events of interest and to notify users of the availability of the events. The system may determine when events of interest are about to occur by accessing information in a suitable database, for example a list of the batting order for a baseball team or an agenda for another type of program, and tracking events occurring in the video stream. As the program advances, the system may send notifications for upcoming events at a suitable time to provide notifications, for example, 1 or 2 minutes before the event is expected to occur, or when the event scheduled just prior to that event begins to occur.

Figure 5:
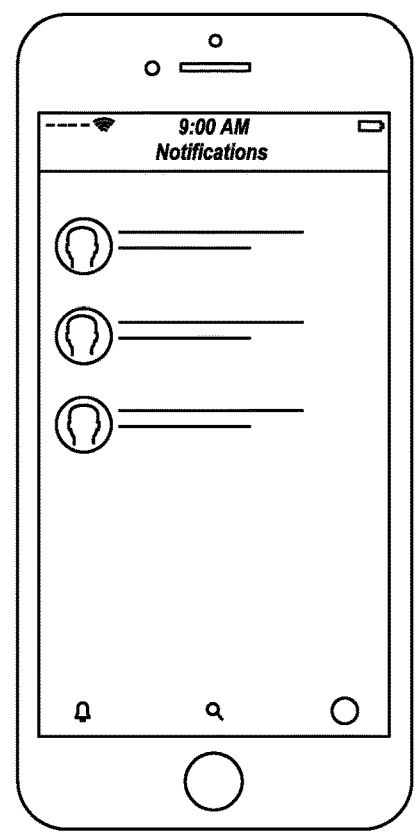

In the illustrative embodiment, an event of interest may be a player who is "followed" coming up to bat. FIG. 5 depicts a graphical interface on a suitable device displaying a notification which includes a link to view the event of interest. Such notifications may be made via the app, using a push notification or by email or text, or as is otherwise known in the art. Such a notification may be sent when the prior player is up to bat, or when prompted by an administrator. It will be appreciated that the system may be continually updated during games by a user or administrator to reflect changes in batting order or other upcoming events of interest.

The event of interest may be provided to the system by any user present at the event. This may be done by using a camera on a portable device 10 to upload video being taken on the device using any suitable video protocol, including RTMP, HLS, or others. In other embodiments, the video may be professionally taken, rather than user provided. Regardless of the original source of the video feed, the system will broadcast the stream out though the network via the app so that any user following the player depicted can view the video through the app, with it being displayed on a mobile device 10 in the same manner with a similar appearance. Each video stream may be saved in a video database with the associated player and team information. This allows each video to be accessed later for reviewing for entertainment or for training or research purposes.

It will be appreciated that in certain embodiments, preexisting video streaming services and databases 40 that are operated by third parties may be utilized. For example, private internet video channels for uploading or streaming video may be used. In one example, each team in an organization may have a private channel established with a video streaming service that is commercially available. Private video channels available from vendors such as YOUTUBE, SPROUTVIDEO, BRIGHTCOVE, NICHE VIDEO MEDIA, and others may be utilized. The commercial vendor may provide the video feed that is displayed by the system on a user's device and provide the data storage for maintaining the video files. Access to the private channel may be controlled by the system. As individual players on the team are about to be present on the video feed (for example "up to bat" in a baseball game), the notifications are generated and sent through the system for the users that follow those players.

It will be appreciated that systems in accordance with the present disclosure may be presented as a layered "app" on a mobile device, with the notification features accessible through an interface to such a video streaming service. For example, where a sport league has a preexisting video streaming app, a system in accordance with the present could be distributed to users as an update to that app. The user information and notification databases could be maintained separately from the video streaming sources and provided to the system for use.

Figure 6:
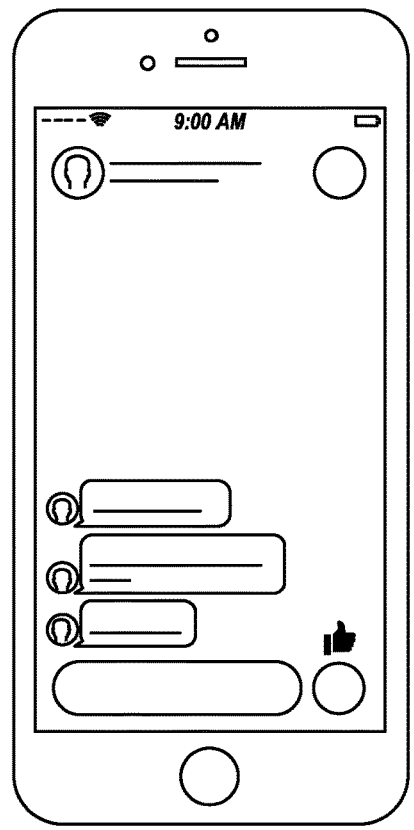

The system may also provide for a real-time commentary by users of the app who watch video of an event of interest. This may be done in a social media feed that is accessible by the followers of the player. As depicted in FIG. 6, this may be accomplished through a graphical interface on a suitable device, as the video is being viewed. The system may then save the commentary with the video for later access.

It will be appreciated that in addition to use for a little league organization, the system could be used with other sports and for leagues at multiple ages and levels (e.g., high school, college, professional). Additionally, the social media and livestream feedback allows for coaches and scouts who are not physically present where a player is to provide feedback during a game so that adjustments may be made and to follow the progress of multiple players regardless of location.

In some embodiments, systems and methods in accordance with the present disclosure could be used to provide notifications for events in videos that are simultaneously being broadcast in a traditional fashion, such as by a television channel either "over the air" or via cable transmission, as well as by an online video streaming service. This could allow users to watch the event in preferred fashion.

The various embodiments disclosed herein may include the use of a special purpose or general-purpose computers or a server including various computer hardware or software modules, as discussed in greater detail below. A computer or a server may include a processor or multiple processors thus affording parallel computing capabilities, and computer storage media carrying instructions that, when executed by the processor and/or caused to be executed by the processor, perform any one or more of the methods disclosed herein. An external database system exemplified by Microsoft SQL Server or Oracle Database or, alternatively, a simplified database system designed specifically for the processes disclosed herein may be part of one of the embodiments of the invention.

As indicated above, embodiments within the scope of the present disclosure also include computer storage media, which are physical media for carrying or having computer-executable instructions or data structures stored thereon. Such computer storage media can be any available physical media that can be accessed by a general purpose or special purpose computer provided this storage media can operate at adequate read/write speeds.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system or a server to implement the disclosed functionalities in this disclosure. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which cause a general purpose computer, special purpose computer, or a server, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein. In terms of computing environments, embodiments of the invention can be performed in client-server environments, whether network or local environments, or in any other suitable environment. Suitable operating environments for at least some embodiments of the invention include network computing environments.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A process comprising:
   registering, via a server, a plurality of users;
   subscribing, via the server, one or more of the plurality of users as a player participating in one or more events;
   subscribing, via the server, one or more of the plurality of users as one or more fans of the player;
   receiving, by the server, from the player or a person acting on behalf of the player authorization granting first level access to one or more of the one or more fans to receive a notification of the occurrence of the one or more events in which the player is participating;
   receiving, by the server, from the player or a person acting on behalf of the player authorization granting second level access to one or more of the one or more fans with first level access allowing the one or more fans granted second level access authorization to allow the server access to one or more social media contacts of the fans granted second level access providing to the one or more social media contacts notification of the one or more events of interest in which the player is participating;
   detecting, via the server, one or more events in which the player is participating will soon occur;
   transmitting, by the server, the notification of the one more events in which the player is participating from the server to the one or more fans with access of the first level prior to the one or more events;
   receiving, by the server, a video stream of the one or more events in which the player is participating; and
   providing access, by the server, to the video stream which includes the one or more events in which the player is participating to the one or more fans with first level access.

2. The process according to claim 1, wherein registering one or more users comprises obtaining and storing information on of one or more events of which the player is participating in a first database and obtaining and storing information for transmitting notifications to the one or more users associated with the information on events.

3. The process according to claim 1, wherein registering the one or more users occurs in response to the one or more users replying to a notification transmitted to the one or more users with information inviting the one or more users to register.

4. The process according to claim 1, further comprising providing to the one or more social media contacts of the fans, authorized at a second level, access to the video stream which includes the one or more events in which the player is participating.

5. The process according to claim 4, wherein the player or person acting on behalf of the player can rescind the registration of the at least one or more of the one or more users granted access of either the first or the second level.

6. The process according to claim 1, wherein providing access to the video stream of one or more events in which the player is participating will occur involving the player comprises aggregating video streams from multiple users of the program to allow display through the server to the one or more users.

7. The process according to claim 1, wherein providing access to a video stream of a program in which one or more events of one or more events in which the player is participating comprises providing the one or more users access to a private internet video channel.

8. The process according to claim 1, wherein detecting when the one or more events of interest in which the player is participating will occur comprises accessing stored information in a suitable database and tracking the one or more events occurring in the video stream.

9. The process according to claim 1, wherein transmitting a notification comprises sending an SMTP message or an email to the at one or more user prior to the one or more events of interest.

10. The process according to claim 1, wherein the one or more user may provide real-time commenting and feedback that is accessible to a player in the video.

11. A system, comprising:
    a server including one or more hardware processors;

a camera configured to gather a video image, and the camera is configured for communication with the server;

a non-transitory storage medium having stored therein computer-executable instructions which, when executed by the one or more hardware processors:

register a plurality of users subscribe one or more of the plurality of users as a player participating in one or more events;

subscribe one or more of the plurality of users as one or more fans;

receive from the player or a person acting on behalf of the player authorization granting access of the first level to one or more of the one or more fans to receive a notification from the server of the occurrence of the one or more events of in which the player is participating;

receive, from the player or a person acting on behalf of the player authorization granting second level access to one or more of the one or more fans with first level access allowing the one or more fans granted second level access authorization to allow the server access to one or more social media contacts of the fans granted second level access providing to one or more social media contacts notification of the one or more events of interest in which the player is participating;

detect one or more events in which the player is participating will soon occur;

transmit the notification of the one more events in which the player is participating from the server to the one or more fans with access of the first level prior to the one or more events in which the player is participating;

receive, by the server, from the camera a video stream of the one or more events in which the player is participating; and provide, via the server, access to the video stream from the server which includes the one or more events in which the player is participating one or more fans with access of the first level.

12. The system of claim 11, wherein registering the one or more users at to receive notifications of the occurrence of one or more events of which the player is participating from the server comprises obtaining and storing information from the one or more events in which the player is participating in a first database and obtaining and storing information for transmitting notifications to the one or more users associated with the information on events.

13. The system of claim 11, wherein registering the one or more users occurs in response to the one or more users replying to a notification transmitted to the one or more users with information inviting the one or more users to register with the system.

14. The system of claim 11, wherein the non-transitory storage medium further includes computer-executable instructions which, when executed by the one or more hardware processors provide to the one or more social media contacts of the one or more fans, authorized at a second level, access to the video stream including one or more events in which the player is participating.

15. The system of claim 11, Wherein the non-transitory storage medium further includes computer-executable instructions which, when executed by the one or more hardware processors allow the player or person acting on behalf of the player can rescind the registration of the at least one or more of the one or more users granted access of either the first or the second level.

16. The system of claim 11, wherein providing access to the video stream of one or more events in which the player is participating will occur comprises aggregating video streams from multiple users of the program to allow display through the system to the one or more users.

17. The system of claim 11, wherein providing access to the video stream of a program in which one or more events in which the player is participating comprises providing the one or more users access to a private internet video channel.

18. The system of claim 11, wherein detecting when one or more events in which the player is participating will occur comprises accessing stored information in a suitable database and tracking one or more events occurring in the video stream.

19. The system of claim 11, wherein transmitting a notification of the one or more events on interest comprises sending an SMTP message or an email to the one or more user prior to the one or more events of interest.

20. The system of claim 11, wherein the non-transitory storage medium further includes computer-executable instructions which, when executed by the one or more hardware processors allow the one or more users to provide real-time commenting and feedback in the system that is accessible to a player of the video.

* * * * *